US011295379B2

(12) United States Patent
Daly, Jr. et al.

(10) Patent No.: US 11,295,379 B2
(45) Date of Patent: *Apr. 5, 2022

(54) VIRTUAL STORAGE SYSTEM AND METHOD OF SHARING ELECTRONIC DOCUMENTS WITHIN THE VIRTUAL STORAGE SYSTEM

(71) Applicant: VIRTUAL STRONGBOX, INC., Charlotte, NC (US)

(72) Inventors: Ronald M Daly, Jr., Centreville, VA (US); Leonard Giambalvo, Fort Mill, SC (US); Robert Jacob Smilie, Concord, NC (US)

(73) Assignee: VIRTUAL STRONGBOX, INC., Charlotte, NC (US)

(*) Notice: Subject to any disclaimer, the term of this patent is extended or adjusted under 35 U.S.C. 154(b) by 8 days.

This patent is subject to a terminal disclaimer.

(21) Appl. No.: 16/920,854

(22) Filed: Jul. 6, 2020

(65) Prior Publication Data

US 2020/0334745 A1    Oct. 22, 2020

Related U.S. Application Data

(63) Continuation of application No. 16/383,753, filed on Apr. 15, 2019, now Pat. No. 10,740,838, which is a
(Continued)

(51) Int. Cl.
*G06F 15/167* (2006.01)
*G06Q 40/02* (2012.01)
(Continued)

(52) U.S. Cl.
CPC ............ *G06Q 40/02* (2013.01); *G06F 16/93* (2019.01); *G06Q 30/0207* (2013.01);
(Continued)

(58) Field of Classification Search
CPC ..... G06Q 40/02; G06Q 30/0207; G06F 16/93
(Continued)

(56) References Cited

U.S. PATENT DOCUMENTS 7,752,403 B1   7/2010   Weinman
8,473,585 B1   6/2013   Smith et al.
(Continued)

OTHER PUBLICATIONS

Dropbox (service)—Wikipedia, the free Encyclopedia, Sep. 2008, pp. 1-11.
(Continued)

*Primary Examiner* — Duyen M Doan
(74) *Attorney, Agent, or Firm* — Brundidge & Stanger, P.C

(57) ABSTRACT

A virtual storage system and a method of storing and sharing electronic documents within a virtual storage system that includes at least one processor that processes a plurality of electronic documents, receives from the user computing device, a request for sharing an electronic document of the plurality of electronic documents, and input information including one or more of the following: access information that includes authentication information for secured access by the recipient and expiration information corresponding to the recipient's access to the electronic document; or download information that includes a number of times the electronic document is to be downloaded by the recipient and expiration information corresponding to the recipient's downloading the electronic document, and creates at least one share link corresponding to the electronic document based on the input information, for sharing the electronic document with a recipient. The virtual storage system further includes a plurality of redundant physical storage devices in data communication with the at least one processor storing the electronic documents and the at least one share link created.

20 Claims, 11 Drawing Sheets

Related U.S. Application Data continuation of application No. 13/752,008, filed on Jan. 28, 2013, now Pat. No. 10,303,778.

(51) Int. Cl.
*G06F 16/93* (2019.01)
*G06Q 30/02* (2012.01)
*G06F 3/06* (2006.01)

(52) U.S. Cl.
CPC ............ *G06F 3/067* (2013.01); *G06F 3/0622* (2013.01); *G06F 3/0637* (2013.01)

(58) Field of Classification Search
USPC .................................................. 709/203, 214
See application file for complete search history.

(56) References Cited

U.S. PATENT DOCUMENTS

| | | | |
|---|---|---|---|
| 10,015,271 B1 | 7/2018 | Chang | |
| 2002/0174010 A1 | 11/2002 | Rice, III | |
| 2004/0073903 A1 | 4/2004 | Melchione | |
| 2004/0117322 A1 | 6/2004 | Bjorksten | |
| 2004/0117456 A1 | 6/2004 | Brooks | |
| 2007/0033637 A1* | 2/2007 | Yami | H04L 9/3234 |
| | | | 726/2 |
| 2007/0271344 A1 | 11/2007 | Danasekaran | |
| 2008/0115227 A1 | 5/2008 | Toutonghi | |
| 2008/0313703 A1 | 12/2008 | Flaks | |
| 2010/0049927 A1* | 2/2010 | Fuente | G06F 11/2087 |
| | | | 711/162 |
| 2010/0063935 A1* | 3/2010 | Thomas | G06Q 20/4014 |
| | | | 705/325 |
| 2010/0082713 A1 | 4/2010 | Frid-Nielsen et al. | |
| 2010/0217837 A1 | 8/2010 | Ansari | |
| 2011/0184998 A1 | 7/2011 | Palahnuk | |
| 2012/0269006 A1 | 10/2012 | Park | |
| 2012/0297466 A1 | 11/2012 | Li | |
| 2012/0331108 A1* | 12/2012 | Ferdowsi | 709/219 |
| 2013/0031016 A1 | 1/2013 | Rubinstein | |
| 2013/0067427 A1* | 3/2013 | Fox | G06F 8/70 |
| | | | 717/101 |
| 2013/0067594 A1 | 3/2013 | Kantor | |
| 2013/0138619 A1 | 5/2013 | Krislov | |
| 2013/0198521 A1* | 8/2013 | Wu | H04L 9/30 |
| | | | 713/175 |
| 2013/0269006 A1 | 10/2013 | Baron | |
| 2013/0283060 A1 | 10/2013 | Kulkarni et al. | |
| 2013/0340656 A1 | 12/2013 | Rainier | |
| 2014/0181053 A1* | 6/2014 | Belanger | G06F 16/176 |
| | | | 707/687 |

OTHER PUBLICATIONS

Cloud Storage—Wikipedia, the free Encyclopedia, Jan. 13, 2008-Oct. 24, 2020, pp. 1-4.
Canadian Office Action, dated Sep. 18, 2020.
Extended European Search Report (EESR) dated Sep. 7, 2016.
Canadian Office Action dated Jun. 22, 2021.

* cited by examiner

VIRTUAL STORAGE SYSTEM AND METHOD OF SHARING ELECTRONIC DOCUMENTS WITHIN THE VIRTUAL STORAGE SYSTEM

CROSS-REFERENCE TO RELATED APPLICATIONS

The present application is a continuation of U.S. patent application Ser. No. 16/383,753 filed Apr. 15, 2019, which is a continuation of U.S. patent application Ser. No. 13/752,008 entitled "Virtual Storage System and Method of Sharing Electronic Documents within the Virtual Storage System" by Ronald M. Daly, Jr. et al. filed on Jan. 28, 2013, which relates to U.S. patent application Ser. No. 13/751,982 entitled "Virtual Storage System and Method of Copying Electronic Documents into the Virtual Storage System" by Ronald M. Daly, Jr. et al. filed on Jan. 28, 2013, now U.S. Pat. No. 9,552,496; U.S. patent application Ser. No. 13/752,023 entitled "Virtual Storage System and File Encryption Methods" by Ronald M. Daly, Jr. et al. filed on Jan. 28, 2013, now U.S. Pat. No. 9,003,183; and U.S. patent application Ser. No. 13/752,043 entitled "Virtual Storage System and File Storing Method" by Ronald M. Daly, Jr. et al. filed on Jan. 28, 2013, the entire disclosures of which are incorporated herein by reference.

BACKGROUND OF THE INVENTION

Field of the Invention

The present invention relates to a virtual storage system. More particularly, the present invention relates to a virtual storage system and a method of sharing electronic documents within the virtual storage system.

Description of the Related Art

Virtual storage systems have become a popular alternative for storing files, thereby eliminating the need to install physical storage devices and minimizing file storage costs. A virtual storage system is an online storage system where data is stored in virtual storage pools. The pools are hosted by third parties that operate large data centers. The third parties virtualize resources in servers and present the resources as virtual storage pools for users to store files, for example. The virtual storage system is accessed through a web application programming interface (API), a gateway or a Web-based user interface (UI), for example. A typical virtual storage system (e.g., a cloud-type storage system) has several disadvantages which create security concerns. For example, the storage location of the files stored therein may be unknown to both third party hosting companies and/or users of the virtual storage system. In addition, the typical virtual storage system can be easily accessed over a communication network (e.g., the Internet) using simple single-factor authentication processes for access thereof. The typical virtual storage system does not encrypt files that are stored on their servers which makes the files easily visible to internal employees and hackers. Further, the typical virtual storage system is not Pci compliant (PCI DSS) a proprietary information security standard for organizations that handle cardholder information for the major debit, credit, prepaid, e-purse, ATM, and POS cards. Further, once any file is stored on the virtual storage system they become property of the virtual storage system provider and are no longer user-owned; therefore the files can be used for other purposes, such as data mining without user permission.

Online banking systems provide resources to enable users to conduct banking transactions electronically from a personal computer, for example. These banking transactions include monitoring accounts, conducting money transfers, applying for loans, submitting loan payments, etc. However, users are required to visit the bank in person, to conduct other transactions such as depositing important documents into a safe deposit box which is an individually secured container held in a bank vault. The safe deposit box is used for storing valuable possessions, such as jewelry, currency, marketable securities, and important documents (e.g., bank statements, wills, passports, property deeds, insurance policies, photographs and birth certificates). Bank personnel typically open the bank vault with a key and a user is required to produce an assigned key to open the safe deposit box.

Currently, online banking systems fail to allow users to store important documents electronically, and also fail to allow users to retrieve, view or share these documents electronically outside of the bank environment, when desired.

SUMMARY OF THE INVENTION

The present invention obviates the above-mentioned disadvantages by providing a virtual storage system that implements a method of sharing electronic documents with others as needed.

Further, the virtual storage system of present invention employs a multi-factor authentication process for verifying user access rights, via a specifically-designed application programming interface (API), for example, that can be installed at a user computing device, thereby providing a maximum security level of file storage for the user.

The virtual storage system of the present invention is also Pci compliant following a proprietary information security standard to allow storage of cardholder information for the major debit, credit card, prepaid, e-purse, ATM, and POS cards.

In addition, the virtual storage system locks each file with encryption as it is uploaded or copied, and only the user-owner holds the key (i.e., access rights) to retrieve the file, thereby leaving ownership of the file with the user-owner at all times and providing extra security protection from unauthorized individuals.

The present invention provides a virtual storage system in data communication with a user computing device via a communication network that includes at least one processor configured to process a plurality of electronic documents received from an external system, receive from the user computing device, a request for sharing an electronic document of the plurality of electronic documents, and input information including download information and expiration information corresponding to the electronic document, as input by a user, and create at least one share link corresponding to the electronic document based on the input information, for sharing the electronic document with a recipient. The virtual storage system further includes a plurality of redundant physical storage devices in data communication with the at least one processor and each configured to store the electronic documents and the at least one share link created.

Further, the present invention is a method implemented by computer system to effect the sharing of a plurality of electronic documents within a virtual storage system including at least one processor in data communication via a communication network with a user computing device, and a plurality of redundant storage devices. The method includes accessing the virtual storage system via the user computing device, selecting and viewing an electronic document of the plurality of electronic documents, to be shared with a recipient, receiving from the user computing device, a request for sharing the electronic document, determining, via the user, download information corresponding to the electronic document to be shared, determining, via the user, expiration information corresponding to the downloading of the electronic document to be shared, creating at least one share link corresponding to the electronic document based on the download information and the expiration information, for sharing the electronic document with a recipient, and storing, via the physical redundant storage devices, the electronic documents and the at least one share link created.

BRIEF DESCRIPTION OF THE DRAWINGS

The foregoing and a better understanding of the present invention will become apparent from the following detailed description of example embodiments and the claims when read in connection with the accompanying drawings, all forming a part of the disclosure of this invention. While the foregoing and following written and illustrated disclosure focuses on disclosing example embodiments of the invention, it should be clearly understood that the same is by way of illustration and example only and the invention is not limited thereto, wherein in the following brief description of the drawings:

DETAILED DESCRIPTION OF THE INVENTION

In the following description, for the purposes of explanation, numerous specific details are set forth in order to provide a thorough understanding of various embodiments of the present invention. It will be apparent, however, to one skilled in the art that embodiments of the present invention may be practiced without some of these specific details. In other instances, well-known structures and devices are shown in block diagram form.

Specific details are given in the following description to provide a thorough understanding of the embodiments. However, it will be understood by one of ordinary skill in the art that the embodiments may be practiced without these specific details. For example, systems, networks, processes, and other components may be shown as components in block diagram form in order not to obscure the embodiments in unnecessary detail. Also, it is noted that individual embodiments may be described as a process which is depicted as a flowchart, a flow diagram, a data flow diagram, a structure diagram, or a block diagram. Although a flowchart may describe the operations as a sequential process, many of the operations can be performed in parallel or concurrently. In addition, the order of the operations may be re-arranged. A process is terminated when its operations are completed, but could have additional steps not included in a figure. A process may correspond to a method, a function, a procedure, a subroutine, a subprogram, etc. When a process corresponds to a function, its termination can correspond to a return of the function to the calling function or the main function.

Furthermore, embodiments may be implemented by hardware, software, firmware, middleware, microcode, hardware description languages, or any combination thereof. When implemented in software, firmware, middleware or microcode, the program code or code segments to perform the necessary tasks may be stored in a machine readable medium. A processor(s) may perform the necessary tasks.

The present invention as will be described in greater detail below provides a method of sharing electronic documents, (e.g., a will, a deed or a banking statement) within a virtual storage system and system implementing the method. The present invention provides various embodiments as described below. However it should be noted that the present invention is not limited to the embodiments described herein, but could extend to other embodiments as would be known or as would become known to those skilled in the art.

Figure 1:
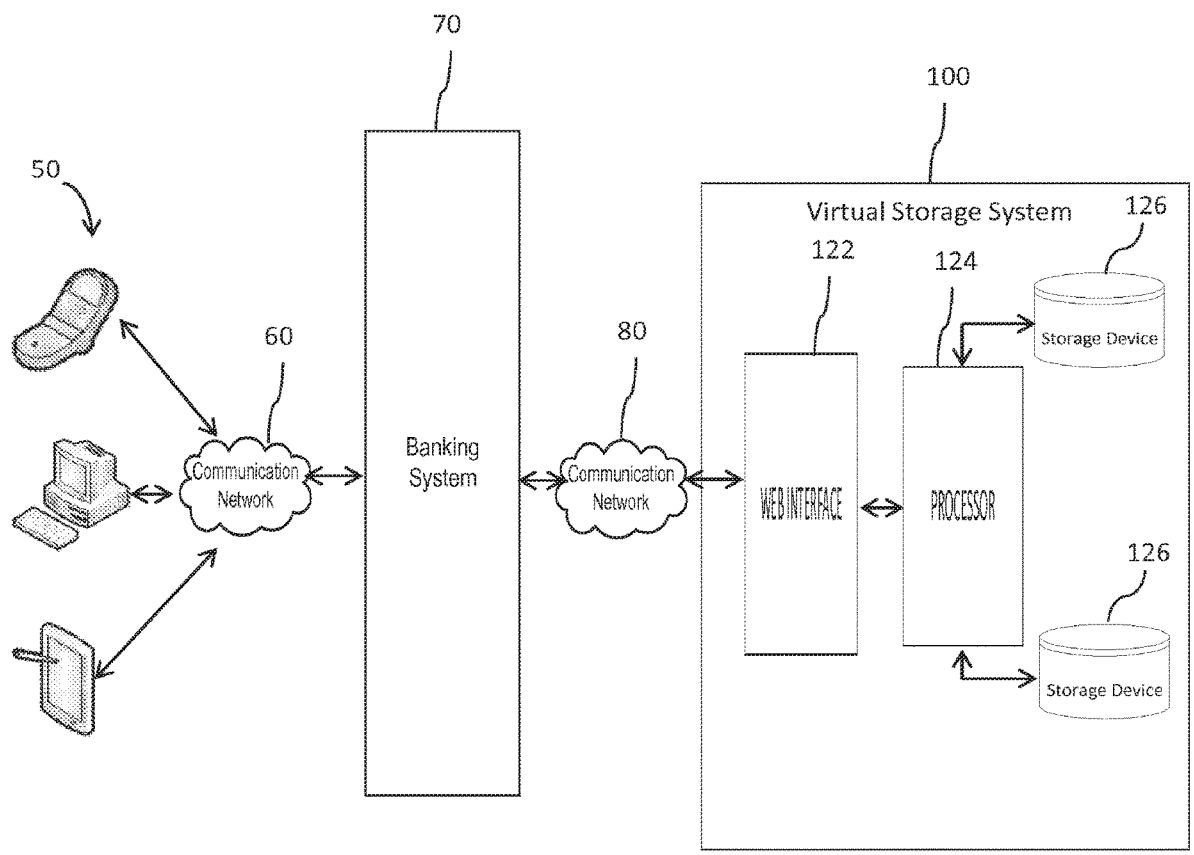
FIG. 1 is a block diagram of a virtual storage system that can be implemented within one or more embodiments of the present invention.

FIG. 1 is a block diagram of a virtual storage system implemented within one or more embodiments of the present invention. In FIG. 1, a user at a user computing device 50 is configured to access, via a communication network 60, an external system i.e., an online document retrieval and storage system such as a banking system 70, to perform online banking transactions, such as viewing bank accounts and bank statements, applying for loans, and other transactions. According to one or more embodiments, the user computing device 50 includes at least one of a mobile phone or smart phone, a personal computer or laptop, a personal digital assistant (PDA), or tablet. The present invention is not limited to any particular type of user computing device 50, and may vary accordingly.

The user accesses the banking system 70 by inputting input data including identification and log-in information such as a user ID and password via a user interface (UI) of the user computing device 50. Once the identification/log-in information is received at a banking application of the banking system 70, the banking system 70 retrieves the user's banking information and displays the banking information via a display of the user computing device 50. The banking system 70 is configured to receive the input data and provide the user with electronic documents (e.g., bank statements) in webpage format or any other format over the communication network 60. The banking system 70 communicates via a communication network 80, with a virtual storage system 100 described in detail below.

The communication networks 60 and 80 include a wired or wireless network for data communication. The data communication across the communication networks 60 and 80 is achieved by using web services technology including for example, Web services Description Language (WSDL). The communication networks 60 and 80 may include any subsystem for exchanging data such as the Internet, intranet, extranet, wide area network (WAN), local area network (LAN), Restful web services, JAVAScript Object Notation (JSON), Extensible Mark-up Language (XML)-based communication network, Simple Object Access Protocol (SOAP)-based Services and satellite communication network. Further, the communication networks 60 and 80 can be other types of networks such as interactive television (ITV). According to one or more embodiments, the communication networks 60 and 80 may be the same or different types of networks.

The virtual storage system 100 is a user-specific storage system which allows each user to have a secure access to their files stored within the virtual storage system 100. In addition, the virtual storage system 100 encrypts each electronic document as it is retrieved from the external system, and only the user-owner can access the electronic document thereby leaving ownership of the files within the virtual storage system 100 with the user-owner at all times.

According to one or more embodiments, the virtual storage system 100 includes a web interface 122 for interfacing with the external system (e.g., the banking system 70) over the communication network 80. The web interface 122 provides secure connection to the virtual storage system 100. According to one or more embodiments, the web interface 122 is a specifically-designed application programming interface (API), for example, which performs authentication of the user or the external system (e.g., the banking system 70) at multiple levels. A secure connection is made between the banking system 70 and the virtual storage system 100 on a transport layer level, for example. According to one or more embodiments, a transport layer security (TLS) or secure sockets layer (SSL) cryptographic protocol may be employed to provide secure communication over the communication networks 60 and 80. According to one or more embodiments, the web interface 122 is a web application programming interface (API), a gateway or a Web-based user interface (UI), for example.

According to one or more embodiments, the virtual storage system 100 is Pci compliant to allow storage of cardholder information for major debit, credit, prepaid, e-purse, ATM and POS cards.

The virtual storage system 100 further includes at least one processor 124 for receiving information including requests from the user at the banking system 70 and processing the requests, such as storing and retrieving electronic documents. The virtual storage system 100 further includes at least one storage server 125 comprising a plurality of physical storage devices 126 for storing files such as electronic documents, audio files, photographs, movies, and images received from the user via the banking system 70. According to an embodiment of the present invention, the files can be stored in any format, for example, Hyper Text Markup Language (HTML), portable document format (PDF) or any other suitable format. The virtual storage system 100 acts as a safe deposit box for receiving and securely storing the files received from the user via the banking system 70. Although only one processor 124 and two storage devices 126 are shown, the present invention is not limited hereto, and may vary accordingly.

As shown in FIG. 1, the virtual storage system 100 includes a web interface (e.g., the web interface 122) however the present invention is not limited to this particular configuration, and may vary accordingly.

Figure 2:
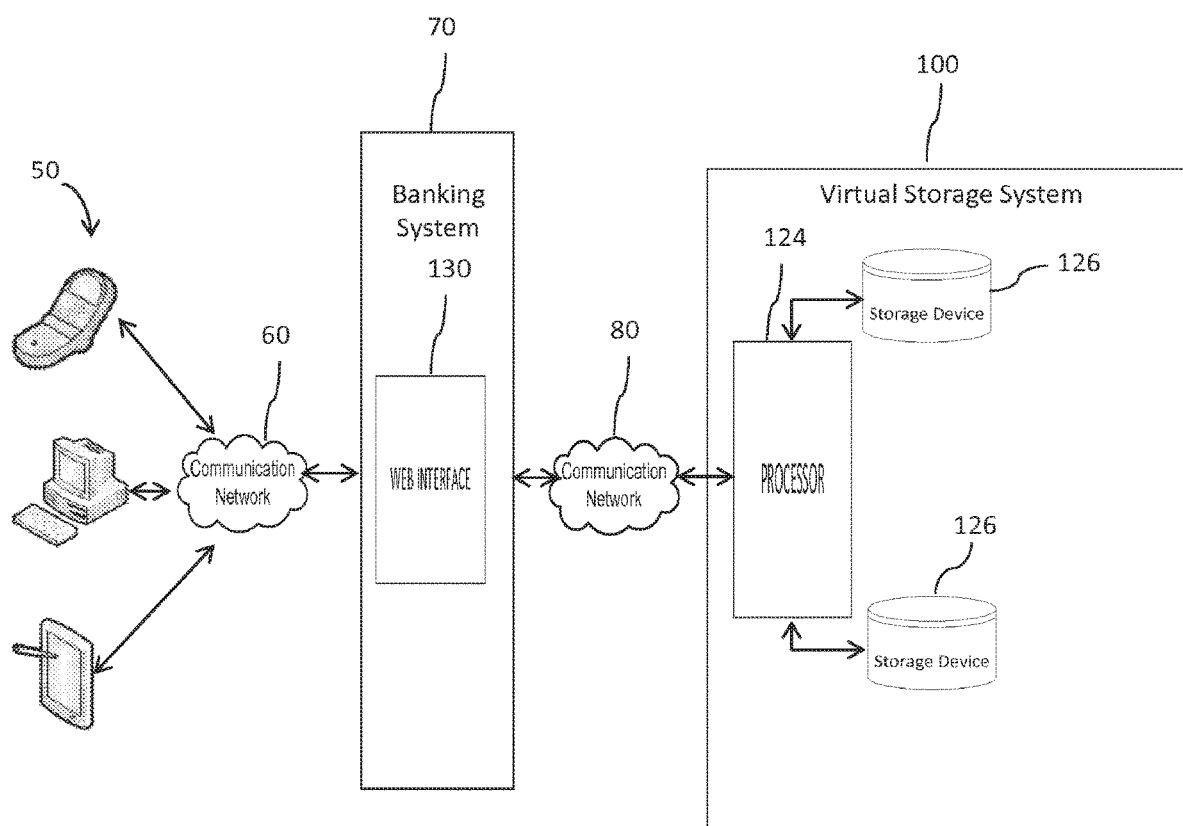
FIG. 2 is a block diagram of a virtual storage system that can be implemented within alternative embodiments of the present invention.
Figure 3:
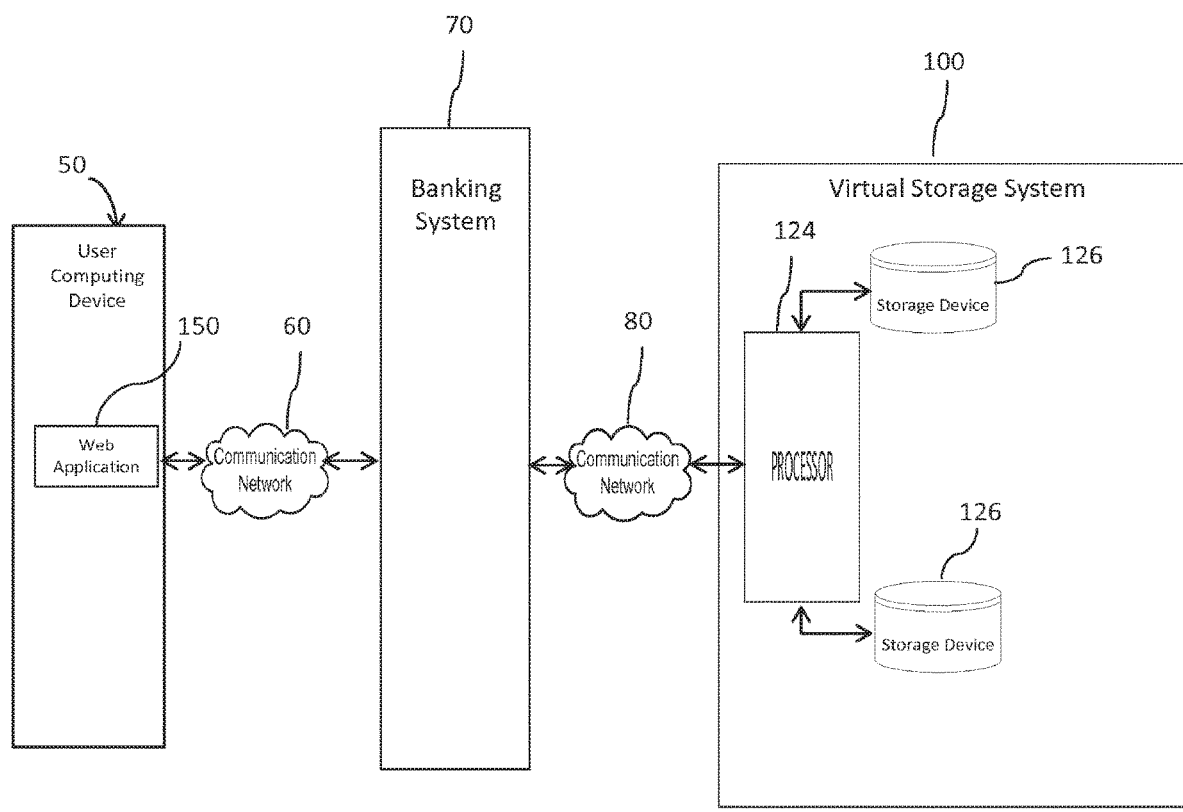
FIG. 3 is a block diagram of a virtual storage system that can be implemented within alternative embodiments of the present invention.
Figure 4:
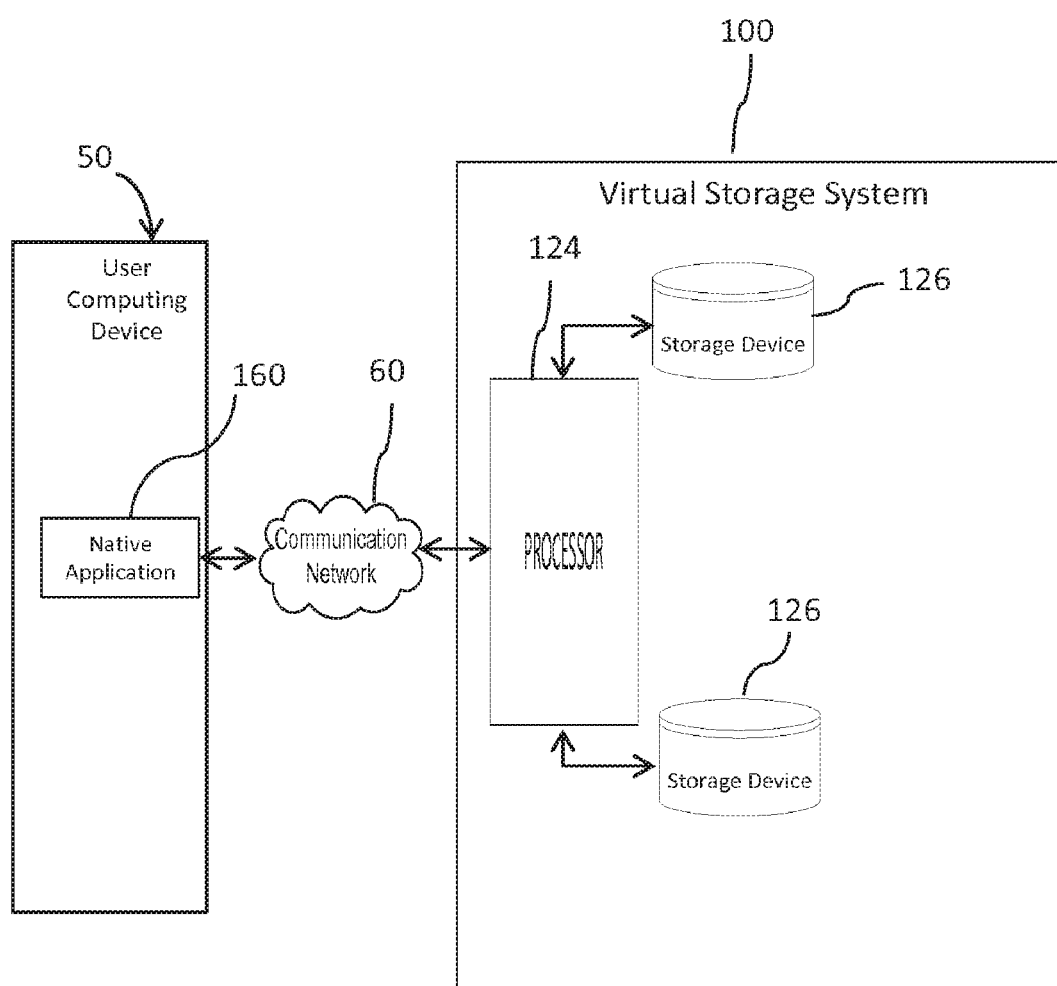
FIG. 4 is a block diagram of a virtual storage system that can be implemented within alternative embodiments of the present invention.

FIGS. 2 through 4 illustrate alternative configurations of the virtual storage system 100, and communication between the virtual storage system 100, the external system (e.g., the banking system 70), and/or the user computing device 50 according to other embodiments of the present invention that may be implemented. Some of the components shown in FIGS. 2 through 4 are the same as the components discussed above with reference to FIG. 1 therefore a detailed description of these components is omitted.

As shown in FIG. 2, in an alternative embodiment, the banking system 70 includes a web interface 130 configured to interface the banking system 70 with the virtual storage system 100 over the communication network 80. The web interface 130 functions in a similar manner as the web interface 122 of the virtual storage system 100 therefore in this embodiment, the web interface 122 of the virtual storage system 100 is omitted.

As shown in FIG. 3, in another alternative embodiment, the user computing device 50 includes a web application 150 (e.g., a web API) for connecting to the banking system 70 and the virtual storage system 100 indirectly through the banking system 70. The web application 150 is an internet-enabled application, for example, that has specific functionality for the user computing device 50 (e.g., a mobile phone). The web application 150 is accessed through a web browser of the user computing device 50 and does not require downloading and installing thereof onto the user computing device 50.

As shown in FIG. 4, in yet another alternative embodiment, the user computing device 50 includes a native application 160 for connecting directly to web services (i.e., the processor 124) of the virtual storage system 100. The native application 160 is directly installed on the user computing device 50 to allow the user to gain direct access to the virtual storage system 100. The native application 160 is a specifically-designed API for accessing the virtual storage system 100. For example, if the user computing device 50 is a tablet, the tablet may include a tablet API for directly accessing the web services of the virtual storage system 100. Therefore, in this embodiment, the web interface 130 of the banking system 70 as shown in the embodiment illustrated in FIG. 2; and the web interface 122 of the virtual storage system 100 as shown in FIG. 3 are omitted.

According to one or more embodiments, the native application 160 may include a multi-factor authentication process to be performed at many levels to enable a user to gain direct access to the virtual storage system 100 from the user computing device 50. The multi-factor authentication process may include steps such as sending login information (e.g., user ID and password information) in a correspondence (e.g., a text message or email) to the user, and providing a time-based one-time password system to the user via a third party.

According to another embodiment, a single-factor authentication process may be used to gain access to the virtual storage system 100 via the external system (e.g., the banking system 70) since the external system and the virtual storage system 100 communicate via a secure connection on the communication network 80.

Figure 11:
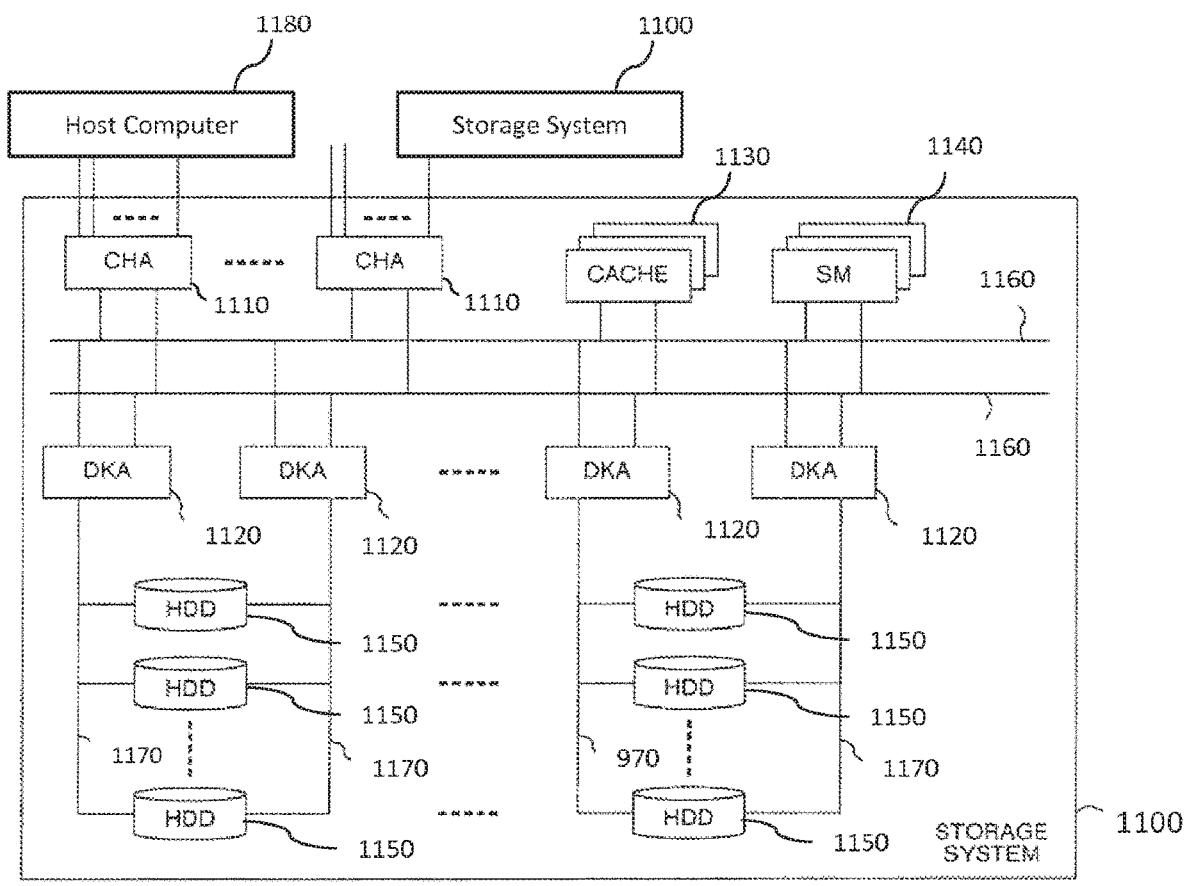
FIG. 11 is a block diagram of an exemplary physical storage system for implementation of the virtual storage system in accordance with one or more embodiments of the present invention.

It should be noted that the virtual storage system 100 as shown in FIGS. 1 through 4 is implemented on a physical storage system 1100 such as that illustrated in FIG. 11.

As shown in FIG. 11, the physical storage system 1100 includes a plurality of host adapters (CHA) 1110, disk adapters (DKA) 1120, cache memories (CACHE) 1130, shared memories (SM) 1140, and hard disk drives (HDD) 1150 connected with each other via common paths 1160 and connection lines 1170. Each of the hard disk drives (HDD) 1150 is connected to two disk adapters 1120, for example, using different connection lines 1170. The host adapters 1110 control data transfer between host computers 1180, the cache memories 1130 and the hard disk drives 1150. The cache memories 1130 temporarily store data received from the host computer 1180 and data read from the hard disk drives 1150. The shared memories 1140 are shared between the host adapters 1110 and the disk adapters 1120. The present invention is not limited to any particular number of host adapters 1110, disk adapters 1120, cache memories 1130, shared memories 1140 and hard disk drives 1150, and may vary accordingly. The physical storage system 1100 is one example of a physical storage system for which the virtual storage system can be implemented thereon. The present invention is not limited to a particular configuration of the physical storage system. According to other embodiments, the hard disk drives (HDD) 1150 can be replaced with a flash storage, RAM disks or rotated disk drives, for example. The host computers 1180 can be the processor 124 or a separate computer, for example. Further, the virtual storage system 100 can be implemented on any type of storage system such as a network-attached storage (NAS), a storage area network (SAN), or a distributed memory array.

Further, according to one or more embodiments, the physical storage devices of the physical storage system 1100 as described above can be configured in a RAID (Redundant Array of Independent Disks) configuration. Further, the reliability of the data stored in the storage devices 126 of the virtual storage system 100 can be stored in a redundant manner in redundant data centers using mirroring, remote copy, or the like. The use of redundant storage devices enables the data stored to be duplicated thereby preventing data loss.

When a user accesses the banking system 70 via a bank server, the user can be automatically directed to the virtual storage system 100 when desired.

As shown in FIGS. 1 through 4, the user computing device 50, banking system 70 and virtual storage system 100 can be connected with each other via the communication networks 60 and 80. According to one embodiment, the user computing device 50 may occasionally connect to the communication network 60 while the banking system 70 and the virtual storage system 100 may maintain a connection to the communication networks 60 and 80. Further, in FIG. 4, the user computing device 50 and the virtual storage system 100 are in direct communication with each other over the communication network 80.

According to alternative embodiments, the virtual storage system 100 can be included within the banking system 70 or the user computing device 50 as installable software.

Figure 5:
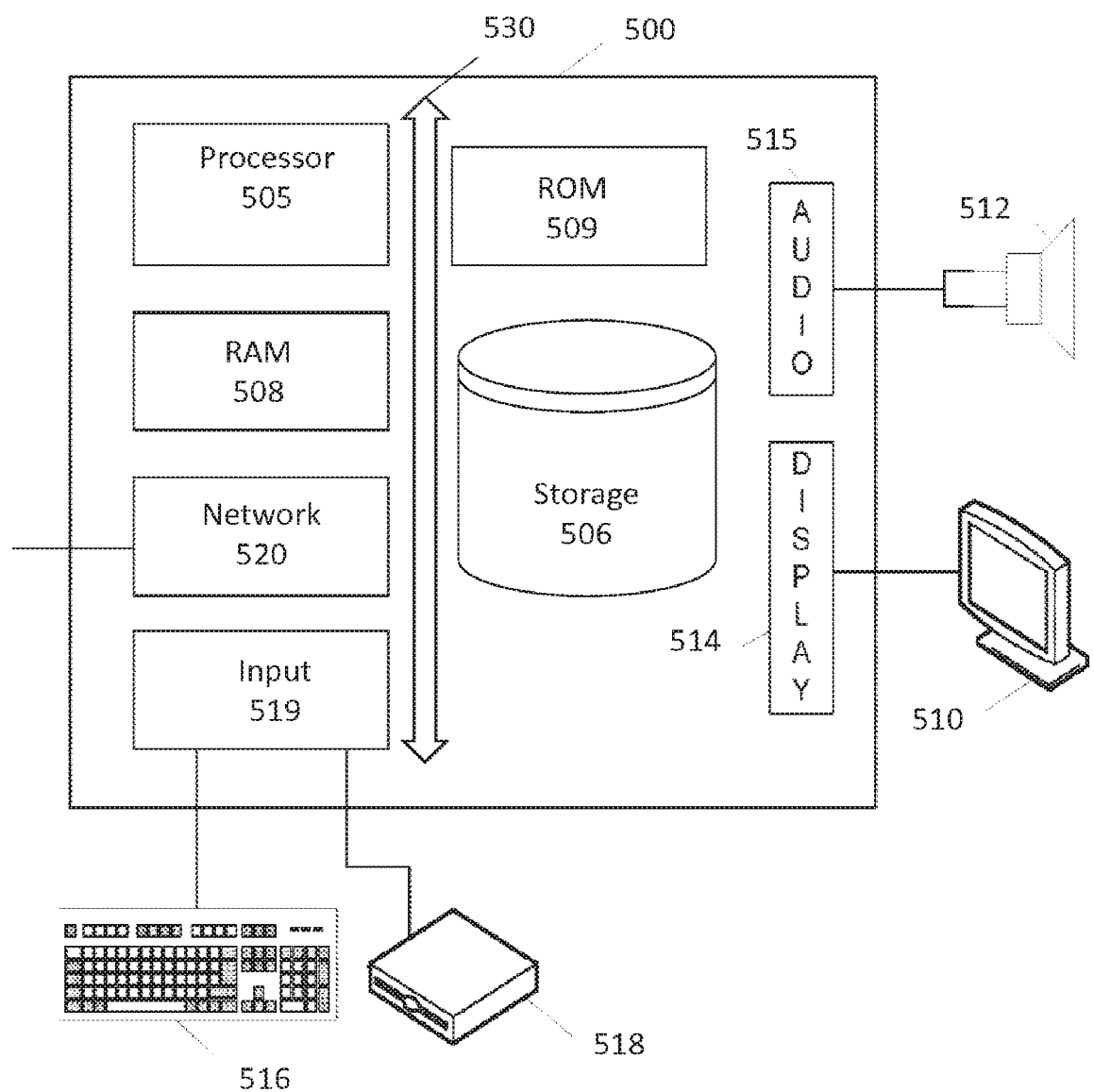
FIG. 5 is a block diagram of an exemplary computer to be implemented within one or more embodiments of the present invention.

FIG. 5 is a block diagram of an exemplary computing device 500 illustrating components of the computing device 50, the banking system 70 and the virtual storage system 100 shown in FIG. 1. As shown in FIG. 5, the computing device 500 includes various components for inputting, outputting, storing and processing data. The computing device 500 includes a processor 505 for performing tasks including executing one or more applications, retrieving data from a storage device e.g., storage 506, and/or outputting data. The processor 505 can be connected to a Random access memory (RAM) module 508 wherein application data and/or instructions may be temporarily stored. The computing device 500 can further includes a Read Only Memory (ROM) 509 configured to allow data stored thereon to persist after the computing device 500 is turned off and is used for storing an operating system (OS) of the computing device 500. The storage device 506 may also provide storage for data files and may include computer readable mediums e.g., disk drives, optical storage mediums e.g., CD ROM drives, magnetic tape storage systems, and flash memory. The processor 505 is configured to retrieve an application from the storage 506 and store the instructions associated with the application in the RAM module 508, while the processor 505 is executing the application. The computing device 500 further includes output devices e.g., a display device 510, and a speaker 512, for outputting visual and audio data via a display adapter 514 and an audio adapter 515. Further, the computing device 500 includes input devices e.g., a keyboard 516, a storage media drive 518, and microphone each having an associated adapter 519 for converting the input data into computer readable data. The storage media drive 518 enables users to read and write data to and from the storage media.

Further, as shown in FIGS. 1 through 4, the user computing device 50 includes one or more components for receiving and transmitting data over the communication networks 60 and 80. For example, a network adapter 520 is provided for communication with one or more computing devices over an IP network, for example, for transmission of data such as financial data over the banking system 70. The network adapter 520 may include instructions associated with processing IP network packets and cellular network packets. The components of the computing device 500 are connected via a system bus 530.

Figure 6:
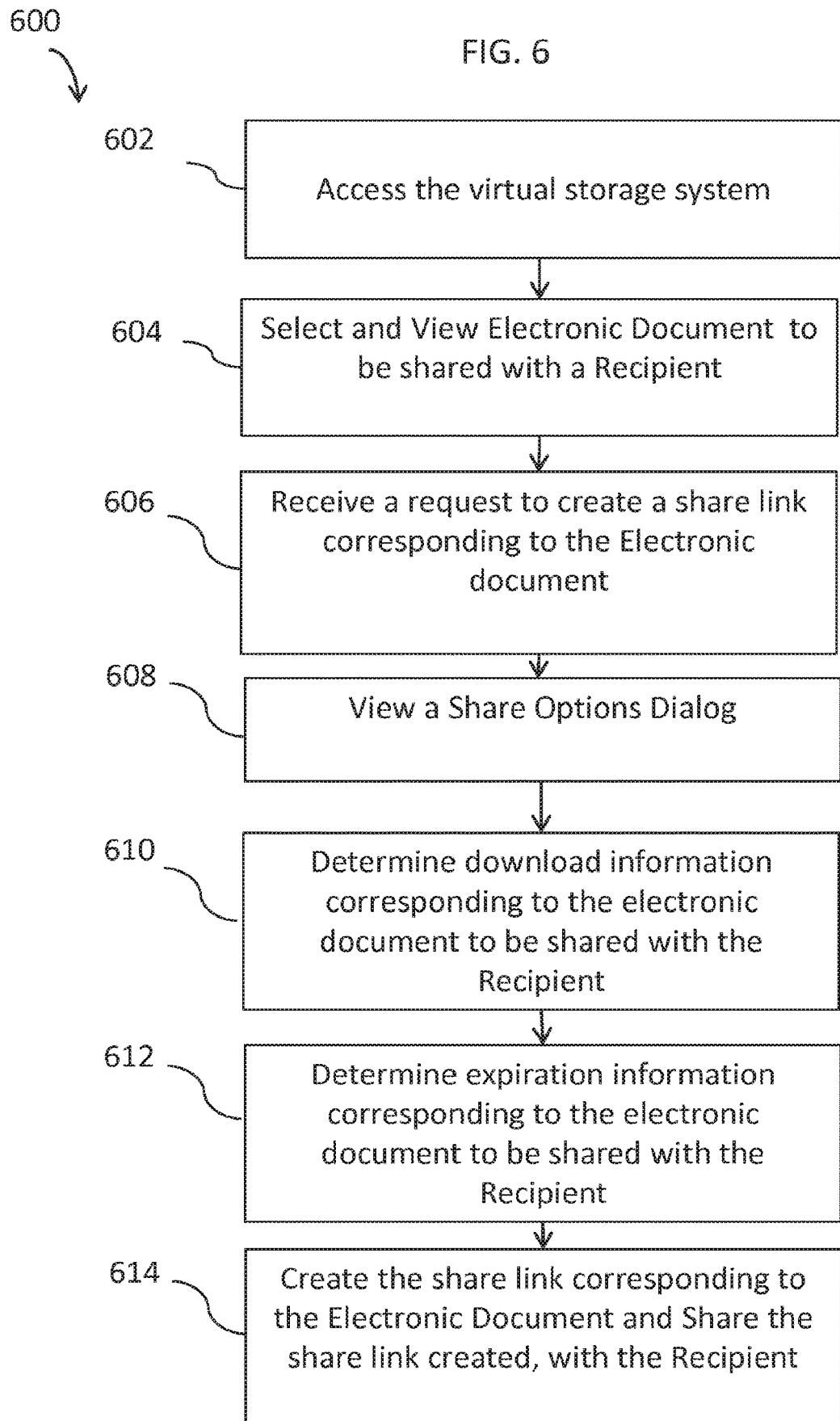
FIG. 6 is a flowchart illustrating a method for sharing electronic documents within the virtual storage system according to one or more embodiments of the present invention.

FIG. 6 is a flowchart illustrating a method 600 for illustrating a method of sharing electronic documents within the virtual storage system 100 of FIG. 1, for example, according to one or more embodiments of the present invention. The method 600 is implemented in software modules for execution by the user computing device 50, the banking system 70 and the virtual storage system 100.

In method 600, the online document retrieval and storage system (e.g., the banking system 70) receives input data from the user at the user computing device 50 for requesting access to online account information (e.g., banking information). At operation 602, the user accesses the virtual storage system 100. According to embodiments of the present invention, the user can access the virtual storage system 100 directly or indirectly via the banking system 70 (as shown in FIGS. 1 through 4).

From operation 602, the process continues to operation 604, where the user selects and views an electronic document to be shared with a recipient, as desired by the user. The user views a plurality of electronic folders within the virtual storage system 100 and selects the electronic document to be shared.

From operation 604, the process continues to operation 606, where the user selects a share option to share the electronic document. The share option is selected by the user from a plurality of option tabs (e.g., add document, create new folder, download document, rename document, delete document, move document, and share documents) available for selection, displayed to the user via the user display (e.g., display 514 depicted in FIG. 5). From operation 606, the process continues to operation 608 where the user views a share options dialog, to configure a share link for sharing the electronic document.

From operation 608, the process continues to operations 610 and 612, where the user determines and inputs input information, via the share options dialog. According to one or more embodiments, the input information includes download information and expiration information corresponding to the electronic document to be shared.

In operation 610, the user determines the download information. According to one or more embodiments, the user determines a number of times the electronic document can be downloaded by the recipient. The user can select from one (1) time to multiple times that the recipient can download the electronic document. The number of times as selected by the user is stored, to be included in the share link created.

In operation 612, the user then determines the expiration information. According to one or more embodiments, the user selects an expiration period for downloading the electronic document by the recipient. For example, the user can select a predetermined number of hours or days before the share link is to expire. According to an embodiment of the present invention, the expiration period can be zero (0) days (i.e., no expiration date) or one or more days, as desired by the user. The expiration period information is also stored, to be included in the share link created.

From operation 612, the process continues to operation 614, where the share link is created using the download information and the expiration information as selected by the user, and the share link created corresponds to the electronic document to be shared. The user then has an option to either copy and paste share link created in a communication (e.g., email or text) to the recipient or generate the communication (e.g., email or text) directly within the virtual storage system, for sending the share link to the recipient.

According to an embodiment of the present invention, the virtual storage system 100 also enables a user to modify or remove any active share links created. That is, any share links in an active state (i.e., a non-expired state)

Figure 7:
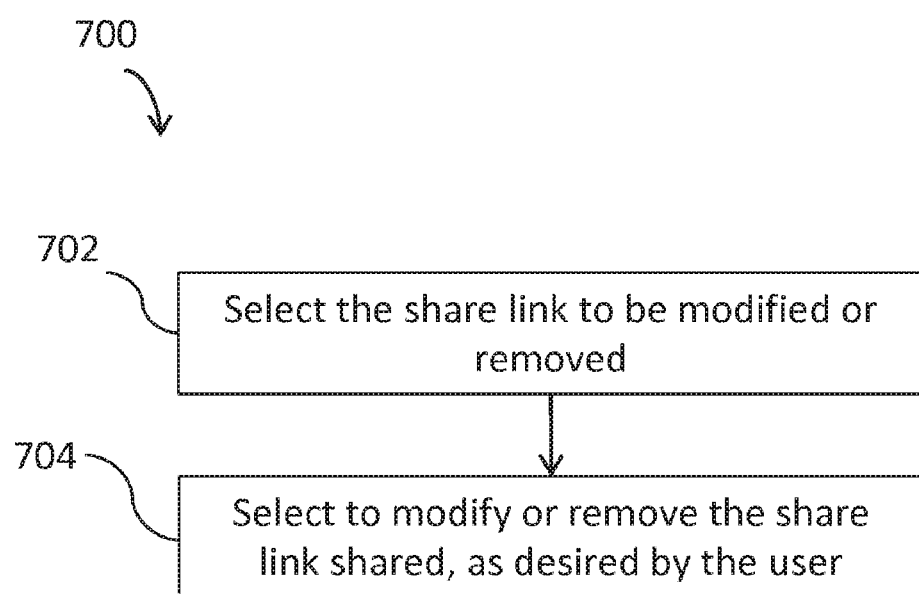
FIG. 7 is a flowchart illustrating a method for modifying or removing a share link according to one or more embodiments of the present invention.

FIG. 7 is a flowchart illustrating a method 700 for modifying or removing a share link according to one or more embodiments of the present invention. As shown FIG. 7, a list of active share links is displayed to the user when desired. At operation 702, the user can select an active share link from the list of active share links to be modified or removed. From operation 702, the process continues to operation 704, where the user then selects to modify or remove the active share link, as desired. For example, if a user desires to set a new expiration period for an active share link, the user can select the active share link to be modified, and modify accordingly. Alternatively, a user may remove (i.e. delete) the active share link and create a new share link, if desired.

The present invention is described herein in terms of block components, screen shots, and optional selections and processing steps. It should be appreciated that the functional blocks may be realized by any number of hardware and/or software components configured to perform the specified functions. For example, the present invention may employ various integrated circuits e.g., memory elements, processing elements, logic elements, look-up tables, and others which may perform the functions under the control of one or more processors or other control devices. The software components can be implemented with any programming or scripting language, with various algorithms implemented with data structures, objects, processes, and other programming elements.

An exemplary process of the methods 600 and 700 of FIGS. 6 and 7 will be described with reference to the screen shots shown in FIGS. 8 through 10. Screen shots 800, 900 and 1000 shown in FIGS. 8 through 10, respectively, are implemented for example, via a web page for network transmission. The web page may include standard HTML documents, and various forms JAVA® applets, active server pages (ASP), common gateway interface scripts (CGI), extensive markup language (SML), dynamic HTML, plugins, etc.

Figure 8:
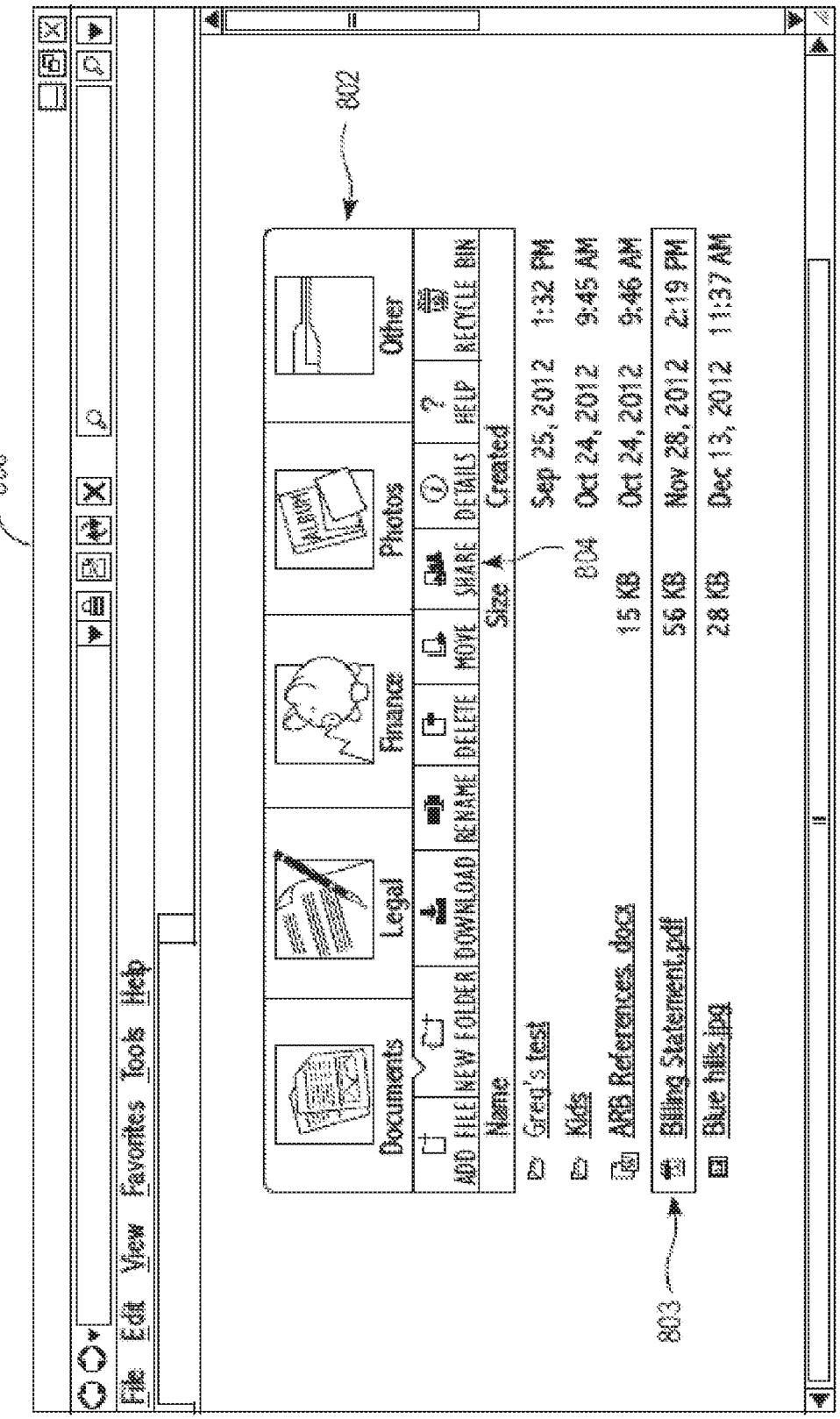
FIG. 8 is a screen shot of the virtual storage system that can be implemented within one or more embodiments of the present invention.

As shown in FIG. 8, the screen shot 800 for a user to access the virtual storage system 100 is provided. As shown, a plurality of electronic folders 802 is displayed to the user upon accessing the virtual storage system 100. The user selects one of the folders 802 to view and select an electronic document 803 (e.g., a billing statement) to the shared. The user then selects the share option 804 to create a share link corresponding to the electronic document 803.

Figure 9:
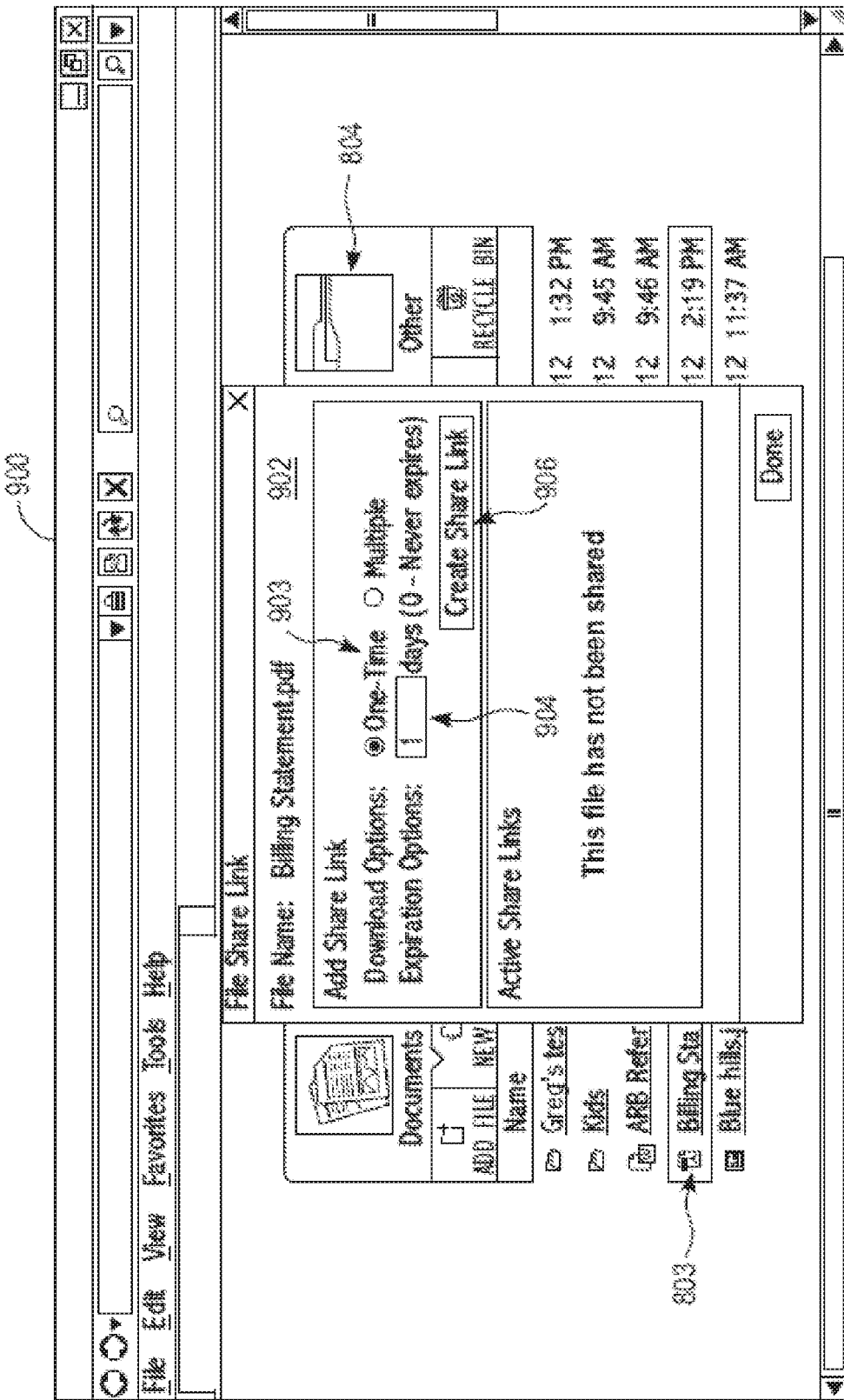
FIG. 9 is a screen shot of a share link creation operation of the method shown in FIG. 6 that can be implemented within one or more embodiments of the present invention.

As shown in FIG. 9, a screen shot 900 includes a share option dialog 902 displayed to the user wherein the user manipulates the share option dialog 902 to configure a share link for sharing the electronic document 803 selected (operation 608 of FIG. 6). The user first determines download information 903, via the share options dialog 902 (operation 610 of FIG. 6). In this embodiment, the user determines a number of times the electronic document 803 can be downloaded by the recipient. As shown, the user may select between one or multiple number of times. According to other embodiments, the user may select a specific number of times for which the electronic document can be downloaded by the recipient. For example, the user may select that the electronic document can be downloaded a total of five (5) times.

Further, the user determines expiration information 904, via the share options dialog 902 (operation 612 of FIG. 6). In this embodiment, the user determines an expiration period for downloading the electronic document 803, by the recipient. As shown, the user may select any predetermined number of days before the share link is to expire, for example, zero (0) days (i.e., no expiration date) or one or more days.

After selecting the download information 903 and the expiration information 904, the user selects a create share link option 906, to thereby create a share link 910 (shown in FIG. 10) based on the download information and the expiration information, and corresponding to the electronic document to be shared (operation 614 of FIG. 6).

Figure 10:
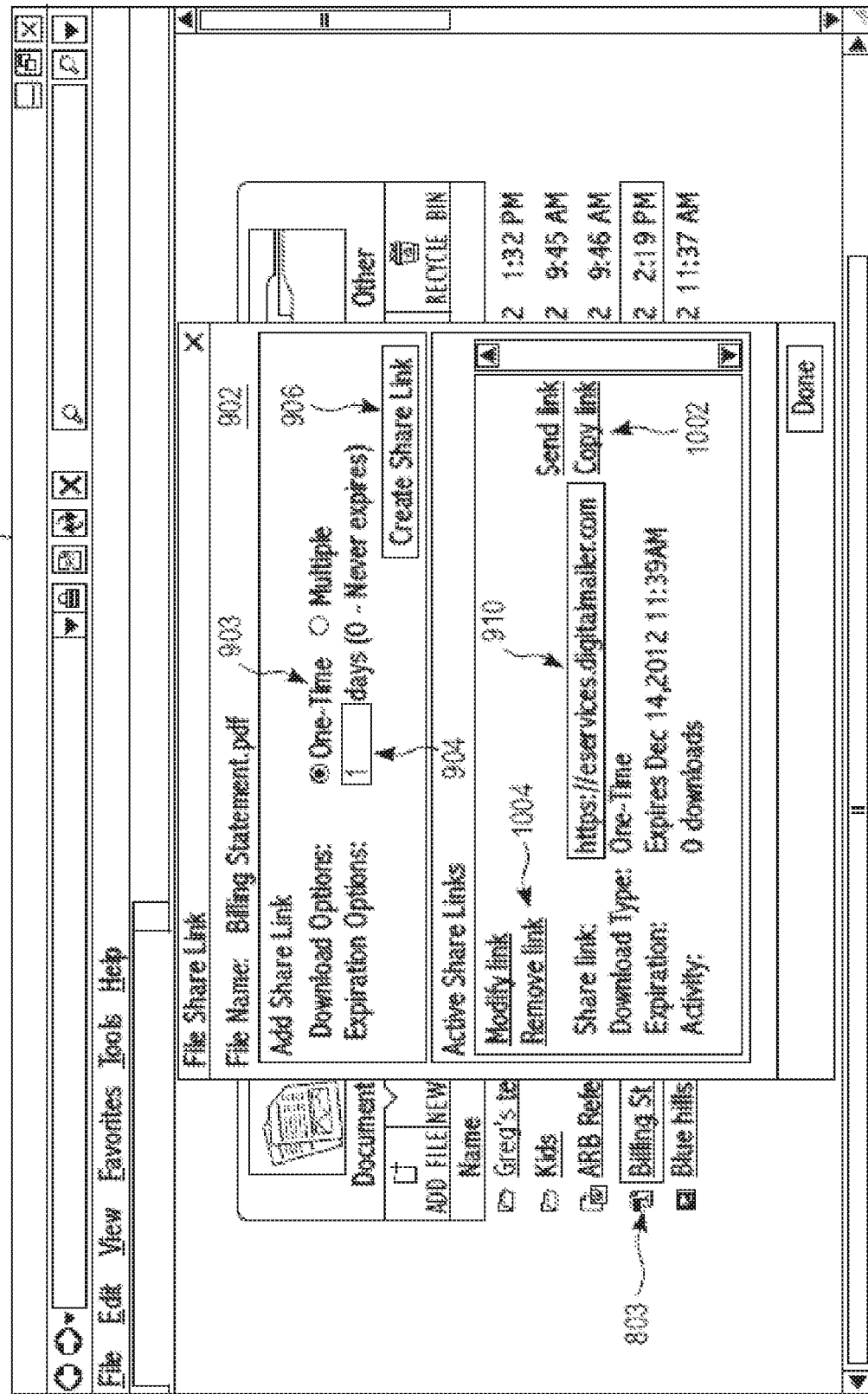
FIG. 10 is a screen shot of an active share link that can be implemented within one or more embodiments of the present invention.

FIG. 10 is a screen shot 1000 illustrates the share link 910 created by the user. As shown, the download type, expiration date and download activity corresponding to the share link 910 created, is displayed to the user. A list of share links created by the user can be displayed within the share options dialog 902. The share links in the list are active share links. According to other embodiments, the user may archive and retrieve share links which have been expired for purposes of recordkeeping, for example. As shown in FIG. 10, the share link 910 created is able to be copied or sent via links 1002 (operation 614 of FIG. 6), or removed or modified via links 1004 (operations 702 and 704 of FIG. 7) in the share options dialog 902.

In view of the above, the present method embodiment may therefore take the form of a computer or controller implemented processes and apparatuses for practicing those processes. This disclosure can also be embodied in the form of computer program code containing instructions embodied in tangible media, such as floppy diskettes, CD ROMs, hard drives, or any other computer-readable storage medium, wherein, when the computer program code is loaded into and executed by a computer or controller, the computer becomes an apparatus for practicing the invention. This disclosure may also be embodied in the form of computer program code or signal, for example, whether stored in a storage medium, loaded into and/or executed by a computer or controller, or transmitted over some transmission medium, such as over electrical wiring or cabling, through fiber optics, or via electromagnetic radiation, wherein, when the computer program code is loaded into and executed by a computer, the computer becomes an apparatus for practicing the invention. When implemented on a general-purpose microprocessor, the computer program code segments configure the microprocessor to create specific logic circuits. A technical effect of the executable instructions is to implement the exemplary method described above.

According to one or more embodiments, a virtual storage system in data communication with a user computing device via a communication network is provided. The virtual storage system comprises at least one processor configured to process a plurality of electronic documents received from an external system, receive from the user computing device, a request for sharing an electronic document of the plurality of electronic documents, and input information including download information and expiration information corresponding to the electronic document, as input by a user, and create at least one share link corresponding to the electronic document based on the input information, for sharing the electronic document with a recipient. The virtual storage system further includes a plurality of redundant physical storage devices in data communication with the at least one processor and each configured to store the electronic documents and the at least one share link created.

According to one or more embodiments, a method implemented by computer system to effect the sharing of a plurality of electronic documents within a virtual storage system including at least one processor in data communication via a communication network with a user computing device, and a plurality of redundant storage devices is provided. The method comprises accessing the virtual storage system via the user computing device, selecting and viewing an electronic document of the plurality of electronic documents, to be shared with a recipient, receiving from the user computing device, a request for sharing the electronic document, determining, via the user, download information corresponding to the electronic document to be shared, determining, via the user, expiration information corresponding to the downloading of the electronic document to be shared, creating at least one share link corresponding to the electronic document based on the download information and the expiration information, for sharing the electronic document with a recipient, and storing, via the physical redundant storage devices, the electronic documents and the at least one share link created.

According to one or more embodiments, a computer readable medium storing computer executable instructions that, when executed, cause a computing device to perform a method of sharing of a plurality of electronic documents within a virtual storage system including at least one processor in data communication via a communication network with a user computing device, and a plurality of redundant storage devices is provided. The method comprising accessing the virtual storage system via the user computing device, selecting and viewing an electronic document of the plurality of electronic documents, to be shared with a recipient, receiving from the user computing device, a request for sharing the electronic document, determining, via the user, download information corresponding to the electronic document to be shared, determining, via the user, expiration information corresponding to the downloading of the electronic document to be shared, creating at least one share link corresponding to the electronic document based on the download information and the expiration information, for sharing the electronic document with a recipient, and storing, via the physical redundant storage devices, the electronic documents and the at least one share link created.

While the invention has been described in terms of its preferred embodiments, it should be understood that numerous modifications may be made thereto without departing from the spirit and scope of the present invention. It is intended that all such modifications fall within the scope of the appended claims.

What is claimed is:

1. A virtual storage system in data communication with a client device through a native application, the virtual storage system comprising:
   at least one hardware processor configured to:
   create an electronic document;
   receive from the client device, a user's request for sharing the electronic document with a recipient and input information, the input information comprising:
      access information, wherein the access information includes authentication information for secured access by the recipient and expiration information corresponding to the recipient's access to the electronic document; and
      download information, wherein the download information includes a number of times the electronic document is to be downloaded by the recipient, and expiration information corresponding to the recipient's download;
   create at least one share link corresponding to the electronic document based on the input information, for sharing the electronic document with the recipient,
   receive a selection of at least one shared link by the user from among a list of shared links to display or modify the input information;
   display the input information, and the recipient's access activity and download activity, corresponding to the selected at least one shared link; and
   modify at least one of the access information or the download information of the selected at least one shared link according to input by the user,
   wherein the recipient accesses and downloads the electronic document through the at least one share link after inputting the authentication information.

2. The virtual storage system of claim 1, wherein the client device is a mobile device or a tablet.

3. The virtual storage system of claim 1, wherein a native application included in the client device is configured to determine the user's access right to the virtual storage system through multi-factor authentication.

4. The virtual storage system of claim 1, wherein the client device comprises a network adapter for transmission of data, and the transmitted data comprises financial data.

5. The virtual storage system of claim 1, wherein the client device comprises a network adapter for transmission of data, and the transmitted data comprises health information.

6. The virtual storage system of claim 5, wherein the client device comprises a network adapter for transmission of data, and the transmitted data comprises instructions associated with processing IP network packets or cellular network packets.

7. The virtual storage system of claim 1, wherein the at least one processor is further configured to receive selection of a folder within a folder structure to store the electronic document.

8. The virtual storage system of claim 1, wherein the at least one share link created is configured to be copied to a communication to the recipient or a communication is generated within the virtual storage system, for sending the at least one share link to the recipient.

9. The virtual storage system of claim 1, wherein the at least one processor is configured to remove the at least one shared link based on an input by the user while in an active state.

10. The virtual storage system of claim 1, wherein the at least one processor is configured to encrypt the created electronic document.

11. The virtual storage system of claim 1, further comprising, a plurality of redundant physical storage devices in data communication with the at least one processor, wherein the electronic document and the at least one share link created are stored in at least one of the plurality of redundant physical storage devices.

12. A method implemented by a computer system for storing and sharing of an electronic document, the method comprising:
    creating an electronic document to be stored in a virtual storage system;
    receiving, from a client device, a user's request for sharing the electronic document and input information, the input information comprising:
        access information, wherein the access information includes authentication information for secured access by a recipient and expiration information corresponding to the recipient's access to the electronic document; and
        download information, wherein the download information includes a number of times the electronic document is to be downloaded by the recipient and expiration information corresponding to the recipient's download;
    creating at least one share link corresponding to the electronic document based on the input information for sharing the electronic document with the recipient;
    receiving the user's selection of at least one shared link from among a list of shared links;
    displaying the input information, and the recipient's access activity and download activity corresponding to the selected at least one shared link; and
    modifying at least one of the access information or the download information to the selected at least one shared link according to input by the user,
    wherein the recipient accesses and downloads the electronic document through the at least one share link after inputting the authentication information.

13. The method of claim 12, further comprising: determining the user's access right to the virtual storage system through multi-factor authentication.

14. The method of claim 12, further comprising:
    copying the at least one share link to a communication to the recipient or generating a communication to the recipient within the computer system, for sending the at least one share link to the recipient.

15. The method of claim 12, wherein the client device comprises a network adapter for transmission of data, and the transmitted data comprises financial data.

16. The method of claim 12, further comprising:
    encrypting the created electronic document prior to storing the created electronic document.

17. A non-transitory computer readable medium storing computer executable instructions that, when executed, cause a computing device to perform operations comprising:
    creating an electronic document;
    receiving, from a client device, a user's request for sharing the electronic document with a recipient and input information, the input information comprising:
        access information, wherein the access information includes authentication information for secured access by the recipient and expiration information corresponding to the recipient's access to the electronic document; and
        download information wherein the download information includes a number of times the electronic document is to be downloaded by the recipient and expiration information corresponding to the recipient's download;
    creating at least one share link corresponding to the electronic document based on the input information for sharing the electronic document with the recipient;
    receiving the user's selection of at least one shared link from a list of shared links;
    displaying the input information, and the recipient's access activity and download activity corresponding to the selected at least one shared link; and
    modifying at least one of the access information or the download information to the selected at least one shared link according to input by the user,
    wherein the recipient accesses and downloads the electronic document through the at least one share link after inputting the authentication information.

18. The non-transitory computer readable medium of claim 17, wherein the operations further comprise: determining the user's access right to the computing device through multi-factor authentication.

19. The non-transitory computer readable medium of claim 17, wherein the operations further comprise:
    copying the at least one share link to a communication to the recipient or generating a communication to the recipient, for sending the at least one share link to the recipient.

20. The non-transitory computer readable medium of claim 17, wherein the operations further comprise:
    encrypting the created electronic document.

* * * * *